United States Patent [19]

Riha

[11] 4,161,824
[45] Jul. 24, 1979

[54] GAP SETTING MEANS
[75] Inventor: Jerry Riha, Mentor, Ohio
[73] Assignee: Robert K. Elder, Twinsburg, Ohio
[21] Appl. No.: 831,359
[22] Filed: Sep. 8, 1977
[51] Int. Cl.$^2$ .............................................. G01B 3/30
[52] U.S. Cl. .............................. 33/180 AT; 33/168 R
[58] Field of Search ........ 33/180 AT, 181 AT, 168 R

[56] References Cited
U.S. PATENT DOCUMENTS
3,063,153 11/1962 Stites .................................. 33/168 R FOREIGN PATENT DOCUMENTS
1181331 6/1959 France ................................ 33/180 AT Primary Examiner—Willis Little
Attorney, Agent, or Firm—Pearne, Gordon, Sessions

[57] ABSTRACT

A gauge and method for facilitating the setting of ignition breaker points in an internal combustion engine of the type in which the breaker point cam is removable from associated structure rotatably supporting it. The gauge is adapted to be substituted for the cam on the associated support structure and to present a surface area for displacing a cam follower a distance corresponding to the high lift point of the removed cam independently of the exact angular position of the gauge. Retained with the substitution gauge is a feeler gauge having a thickness corresponding to the desired gap of the points.

1 Claim, 4 Drawing Figures

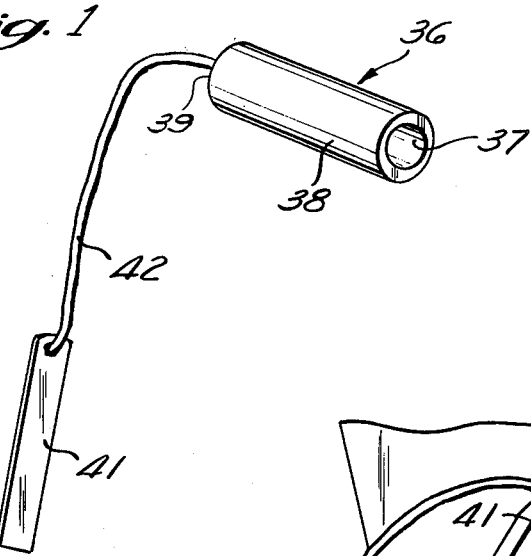
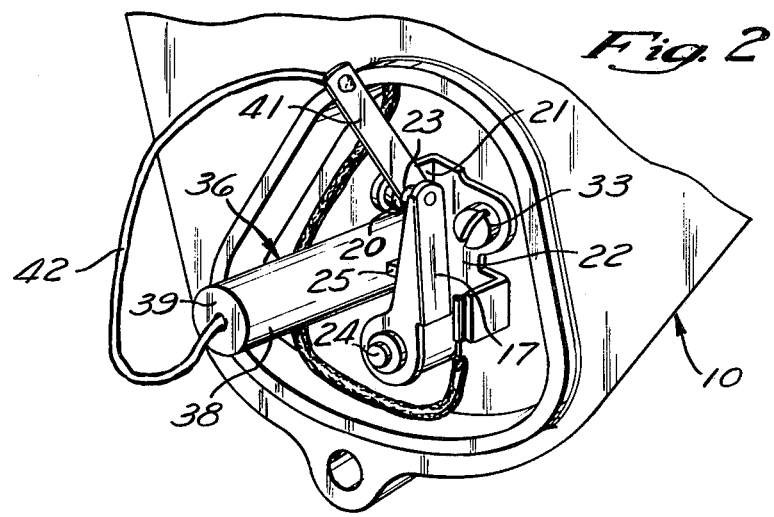
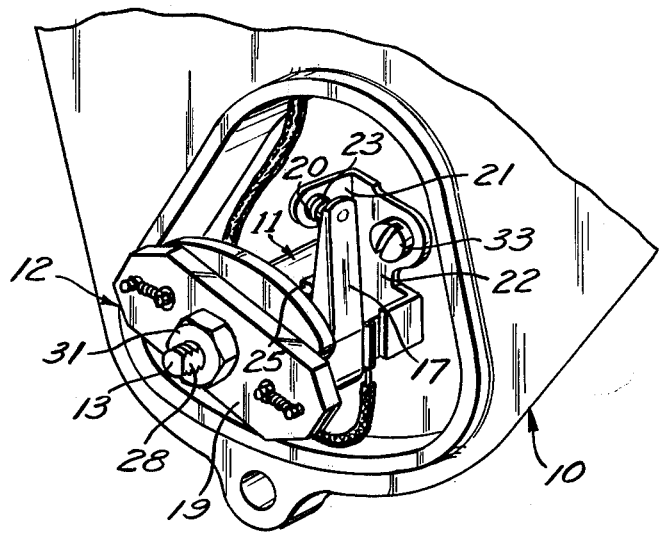
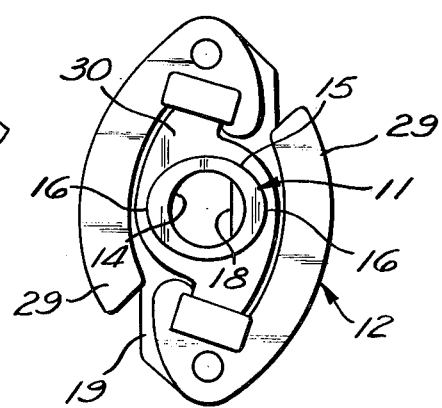

GAP SETTING MEANS

BACKGROUND OF THE INVENTION

The invention relates to devices for adjusting ignition breaker points on internal combustion engines.

PRIOR ART

In an internal combustion engine, the gap of ignition breaker points, because of mechanical wear and electrical arcing, must be periodically adjusted to an optimum setting, where the breaker points either are retained or replaced. The adjustment procedure is often time-consuming, tedious, and susceptible of error where, for example, the breaker points are in a confined or nearly inaccessible area. One problem which has previously been recognized is the difficulty in accurately positioning the breaker point cam in angular orientation corresponding to its maximum lift. This problem is aggravated where the cam and breaker points are in an area which is difficult to view.

It is known, for example, from U.S. Pat. No. 3,063,153 to provide a cylindrical ring over the lobes of a breaker point cam to avoid the necessity of precisely adjusting the angular position of the cam. Use of such a ring, because it increases the lift of the cam by its wall thickness, actually complicates the procedure, since the points are spaced a distance greater than the ring wall thickness because of the geometry of the pivot arm carrying the movable breaker point. U.S. Pat. Nos. 2,838,842 and 3,308,548 disclose the use of chordal segments to complement flat side faces of hexagonally or like shaped cams. While reducing the criticality of the angular position of the breaker point cam, in practice, such arrangements still require care that the edges of the chordal segments be positioned away from the cam follower. Moreover, it would appear that such arrangements, wherein a segment engages and complements a cam surface to form a circular section, are limited to square, hexagonal, octagonal or like discontinuous flat-sided cam profiles. U.S. Pat. No. 3,284,908 discloses a device in which a plurality of feeler gauges are carried on a head which, during use, is supported on a distributor shaft with a selected one of the feeler gauges inserted between the adjacent breaker points.

SUMMARY OF THE INVENTION

The invention comprises a gauge for facilitating the adjustment of breaker points in an internal combustion engine which, in use, is temporarily positioned on a supporting drive shaft in place of the breaker point cam. The gauge presents to a cam follower a surface which is spaced from the breaker point drive shaft a distance corresponding directly to a high lift point of the breaker point cam and which is functionally independent of the angular position of the cam drive shaft. As a result, the possibility of error in adjustment of the breaker points resulting from improper angular positioning of the breaker point cam drive shaft is eliminated.

In the illustrated embodiment, the gauge is used in a type of engine in which the breaker point cam is removably mounted on an associated drive shaft. As disclosed, the gauge is a tubular, cylindrical body having an inside diameter closely fitting the outside diameter of the cam drive shaft and an outside diameter equal to the diameter of the circular locus of the high points of the cam. Because of its cylindrical profile the gauge, when mounted on the cam drive shaft, avoids the necessity of angularly aligning the shaft to a particular position, as would be required under conventional practice in using a high point of the breaker point cam to open the points. Further, the gauge body is ideally constructed to avoid any key on the drive shaft so that no angular alignment of the gauge to the shaft is required and positioning of the gauge thereon is facilitated.

As disclosed, the gauge may be used on an engine employing an integrated breaker point cam and mechanical timing advance mechanism. In this case, by substitution of the gauge for both the cam and advance mechanism, the procedure for setting the points is greatly facilitated, since obstruction of the points and cam follower by the advance mechanism is eliminated. Consequently, accessibility, illumination, and view of the breaker point area are improved. It will be clear from an understanding of the invention that its benefits include reductions in the level of skill required in adjusting the gap of the ignition breaker points, a savings in time and avoidance of tedium for the mechanic, and an increase in potential for accurate work.

BRIEF DESCRIPTION OF THE DRAWINGS

FIG. 1 is a perspective view of a breaker point cam substitution gauge and combined breaker point feeler gauge constructed in accordance with the invention;

FIG. 2 is a perspective view of the substitution gauge in the position wherein it replaces a breaker point cam and associated mechanical advance mechanism, the feeler gauge being disposed between a set of breaker points;

FIG. 3 is a perspective view similar to FIG. 2 showing a typical breaker point cam and advance mechanism assembly in its normal position; and FIG. 4 is an axial end view of a typical breaker point cam.

DESCRIPTION OF THE PREFERRED EMBODIMENT

Referring now to the drawing, and in particular to FIG. 3, there is illustrated a portion of a block 10 of an internal combustion engine of a type in which a breaker point cam 11 and mechanical advance mechanism 12 are unitized and are removably supported on a driving shaft 13. A commercially available example of such an engine is that provided on motorcycles sold under the registered trademark BMW, where the breaker point cam driving shaft 13 is an integral extension of the valve operating camshaft. FIG. 4 illustrates the profile of the breaker point cam 11, as viewed from its inner end. The cam 11 is a tubular structure having a cylindrical inner bore 14 and an outer surface 15, including two diametrically opposed lobes, the apex or high point 16 of each representing points of greatest lift of a movable breaker point arm 17.

The diameter of the inner bore 14 of the cam 11 is dimensioned to produce a close slip fit on the shaft 13. The cam 11 is driven through the mechanical advance mechanism, indicated generally at 12. The mechanism 12 includes a plate 19 having a D-shaped hole 18 keyed on a flat 28 formed on an adjacent area of the cam driving shaft 13. Flyweights 29 pivotally connected to the plate 19 drive the cam 11 through a crosspiece 30 permanently fixed, as by welding, to the cam.

In a conventional manner, a pair of ignition contact points comprise a fixed contact 20 on a right angle extension 21 of a mounting plate 22 and a movable contact 23 on the arm 17. The breaker point arm 17 is pivotal on a pin 24 fixed to the mounting plate 22. A cam follower 25 is fixed on the midpoint of the breaker point arm 17 and rides on the outer cam surface 15 under the influence of a spring biasing it towards the cam driving shaft 13.

Due to wear of the cam follower 25 and the contact points 20 and 23, it is periodically necessary to adjust the points or their replacements by loosening a screw 33 and moving the mounting plate 22 closer to or farther from the cam driving shaft 13 such that when a high point 16 of the cam 11 is directly beneath the cam follower 25, the points are spaced by a specified gap.

Such an adjustment under ordinary circumstances may be relatively difficult because the relevant area of the engine block 10 is obstructed by surrounding structure. Moreover, inspection of FIG. 3 reveals that the cam follower 25 and cam area are substantially obstructed by the mechanical advance mechanism 12.

In accordance with the invention, the cam 11 and integrated mechanical advanced mechanism 12 are temporarily removed from the driving shaft 13 by removal of a retaining nut 31 and exertion of a slight outward pulling force on the assembly. The cam is thereafter temporarily replaced by a tubular substitution gauge 36.

As indicated in FIG. 1, the gauge 36 is a cylindrical body having an interior bore 37 of predetermined size to provide a relatively close slip fit on the cam driving shaft 13. An outer cylindrical surface 38 of the gauge 36 has a diameter of a predetermined nominal size equal to the diameter of the locus of the apex points 16 of the cam 11. The length of the gauge 36 is sufficient to enable it to extend over the shaft 13 and support the full axial extent of the follower 25. Ideally, the length of the cylindrical gauge bore 37 is sufficient to avoid any interengagement or keying with the flat 28 on the distal end of the cam driving shaft 13.

By way of example, for use on the engine of a motorcycle currently marketed under the BMW registered trademark, the gauge 36 has an outside diameter of 0.470 in. (11.8 mm.) and an inside diameter of 0.355 in. (9.00 mm.), and a length of 1.7 in. (43 mm.). Ideally, the wall thickness of the gauge 36 for purposes of ease of production is dimensioned with a relatively close tolerance in the order of, for example, ±0.0005 in. (0.0127 mm.). At the same time, the inside and outside diameters of the gauge 36 may be manufactured to a somewhat greater tolerance, for example ±0.001 in. (0.0254 mm.), with the only restriction being that the inside diameter be no less than any expected diameter of the cam driving shaft 13 within normal manufacturing tolerances of such shaft. Preferably, the gauge 36 is formed of chrome-plated steel for durability.

In the illustrated embodiment, one end of the cylindrical gauge 36 is closed by a generally radial end wall 39. Combined with the cylindrical substitution gauge 36 is a flat feeler gauge 41 attached to the substitution gauge by a strand 42 of wire cable or the like. One end of the strand 42 is fastened to the substitution gauge 36 at a central hole in the end wall 39, while the opposite end is suitably fastened to the feeler gauge 41. The thickness of the feeler gauge 41 is equal to a specified optimum gap setting of the breaker contact points 20 and 23, for example, 0.015 in. (0.37 mm.). As indicated in FIG. 2, the strand 42 is of sufficient length to readily permit the feeler gauge 41 to be disposed between the contact points 20 and 23, while the substitution gauge 36 is operatively disposed on the cam driving shaft 13.

With the feeler gauge 41 being retained with the substitution gauge 36 by the strand 42, the tendency of mislaying one or the other is reduced and the risk of inadvertently selecting an incorrect feeler gauge is eliminated. Other means is contemplated for suitably retaining the feeler gauge 41 to the substitution gauge 36, at least during periods of storage in a tool box or other repository. Other suitable means include spring clips, pouches, and so on, which are also useful in displays for merchandising the gauges in retail outlets.

Use of the substitution gauge 36 and feeler gauge 41 should be self-evident to those skilled in the art from the foregoing disclosure. With the substitution gauge 36 on the shaft 13 and supporting the follower 25, and with the screw 33 loosened, the plate 22 is shifted closer to or farther from the gauge 36 until the gap between the points 20 and 23, measured by disposing the feeler gauge 41 between the points, is substantially equal to the thickness of the feeler gauge. The screw 33 is then tightened, the gauges 36 and 41 are removed, and the mechanical advance 12 and cam 11 are replaced on the shaft 13.

It will be understood from the foregoing description that the task of accurately setting the gap between the points 20 and 23 is greatly facilitated by the use of the substitution gauge 36. Use of the substitution gauge 36 results in a reduction of effort, required skill, and time, since it allows the mechanical advance mechanism 12 to be removed from its normally obstructing operative position and allows the points to be set without regard to the angular positions of either the cam driving shaft 13 or the substitution gauge itself. Such benefits are especially helpful where the relevant area of the motor block 10 is in an area which is awkward to reach and/or difficult to view.

Although a preferred embodiment of this invention is illustrated, it is to be understood that various modifications and rearrangements of parts may be resorted to without departing from the scope of the invention.

What is claimed is:

1. A method of adjusting the gap of a set of ignition breaker contact points on an internal combustion engine in a BMW motorcycle having a combined mechanical timing advance mechanism and tubular breaker point cam both removably mounted on a driving shaft, comprising the steps of removing both the mechanical advance mechanism and breaker point cam from the shaft, providing a first cylindrical, tubular gauge having a cylindrical bore of 0.355 inch (9.00 mm.) nominal diameter and an outer cylindrical surface concentric with said bore and of 0.470 inch (11.8 mm.) nominal diameter resulting in a gauge wall thickness equal to the maximum wall thickness of the tubular breaker point cam, disposing the first gauge on the shaft such that the cam follower is displaced from the shaft a distance corresponding to the maximum lift produced by said cam, providing a second gauge having a thickness corresponding to a desired gap between the breaker points, disposing the second gauge between the points while the first gauge is disposed on the shaft, adjusting one of the breaker points relative to the other to develop a gap substantially equal to the thickness of said second gauge, locking said one breaker point in the position determined by said second gauge, thereafter removing said first and second gauges and replacing said tubular breaker point cam and mechanical timing advance mechanism on said shaft.

* * * * *